US010609151B2

(12) United States Patent
Jiménez et al.

(10) Patent No.: US 10,609,151 B2
(45) Date of Patent: Mar. 31, 2020

(54) COMMUNICATING WITH A CONSTRAINED INTERNET DEVICE (71) Applicant: Telefonaktiebolaget L M Ericsson (publ), Stockholm (SE)

(72) Inventors: Jaime Jiménez, Helsinki (FI); Gonzalo Camarillo Gonzalez, Helsinki (FI); Manuel Urueña Pascual, Leganés (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1273 days.

(21) Appl. No.: 14/430,365

(22) PCT Filed: Sep. 25, 2012

(86) PCT No.: PCT/EP2012/068866
§ 371 (c)(1),
(2) Date: Mar. 23, 2015

(87) PCT Pub. No.: WO2014/048450
PCT Pub. Date: Apr. 3, 2014

(65) Prior Publication Data
US 2015/0229726 A1  Aug. 13, 2015

(51) Int. Cl.
*G06F 15/16* (2006.01)
*H04L 29/08* (2006.01)
(Continued)

(52) U.S. Cl.
CPC .......... *H04L 67/141* (2013.01); *H04L 67/104* (2013.01); *H04L 67/1074* (2013.01);
(Continued)

(58) Field of Classification Search
CPC . H04L 67/141; H04L 67/104; H04L 67/1074; H04L 67/12; H04L 67/2861;
(Continued)

(56) References Cited

U.S. PATENT DOCUMENTS

2010/0125670 A1* 5/2010 Dondeti ................ H04L 67/104
709/229
2010/0131550 A1* 5/2010 Nakadai ................. H04L 45/00
707/769

(Continued)

OTHER PUBLICATIONS

Jennings, C. et al., "REsource LOcation and Discovery (RELOAD) Base Protocol draft-ietf-p2psip-base-21", Internet Engineering Task Force, P2PSIP, Internet-Draft, Mar. 28, 2012, 1-167.

(Continued)

*Primary Examiner* — Oscar A Louie
*Assistant Examiner* — Oluwatosin M Gidado
(74) *Attorney, Agent, or Firm* — Murphy, Bilak & Homiller, PLLC (57) ABSTRACT According to a first aspect there is provided a method of enabling an Internet device that is only awake periodically to receive communications sent when the device is not awake. The method comprises, at the device, during an initial awake period, establishing a connection to a peer of a RELOAD overlay network as a RELOAD client, and creating a dictionary resource at the RELOAD peer using the Node-ID of the device as the Resource-ID. Then, during a further awake period, establishing a connection to the RELOAD peer and obtaining any communications sent to the device during a sleeping period of the device by retrieving data from the dictionary resource stored at the RELOAD peer.

21 Claims, 4 Drawing Sheets (51) Int. Cl.

| | | |
|---|---|---|
| *H04W 4/18* | (2009.01) | |
| *H04W 4/70* | (2018.01) | |
| *H04W 4/38* | (2018.01) | |
| H04W 52/02 | (2009.01) | |
| H04W 76/27 | (2018.01) | |

(52) U.S. Cl.
CPC ............... *H04L 67/12* (2013.01); *H04W 4/18* (2013.01); *H04W 4/38* (2018.02); *H04W 4/70* (2018.02); *H04L 67/2861* (2013.01); *H04W 52/0209* (2013.01); *H04W 76/27* (2018.02); *Y02D 70/00* (2018.01); *Y02D 70/21* (2018.01); *Y02D 70/22* (2018.01)

(58) Field of Classification Search
CPC ....... H04W 4/005; H04W 4/006; H04W 4/18; H04W 52/0209; H04W 76/046; Y02B 60/50
USPC ......................................................... 709/227
See application file for complete search history.

(56) References Cited

U.S. PATENT DOCUMENTS

| | | | | |
|---|---|---|---|---|
| 2010/0157863 | A1* | 6/2010 | Gong | .................... G06F 1/3209 370/311 |
| 2011/0176407 | A1* | 7/2011 | Campbell | ........... H04W 76/064 370/216 |
| 2011/0205949 | A1* | 8/2011 | Maenpaa | ............ H04W 40/005 370/311 |
| 2012/0151028 | A1 | 6/2012 | Lu et al. | |
| 2012/0198051 | A1* | 8/2012 | Maenpaa | .......... H04L 29/12113 709/224 |
| 2012/0317492 | A1* | 12/2012 | Sheeder | .......... H04N 21/25891 715/738 |
| 2015/0304411 | A1* | 10/2015 | Cheng | .................... H04L 67/16 709/203 |

OTHER PUBLICATIONS

Jimenez, J. et al., "A Constrained Application Protocol (CoAP) Usage for REsource Location and Discovery (RELOAD) draft-jimenez-p2psip-coap-reload-02", Internet Engineering Task Force, Internet-Draft, Aug. 20, 2012, 1-18.

Mäenpää, Jouni et al., "Using RELOAD and CoAP for wide area sensor and actuator networking", EURASIP Journal on Wireless Communications and Networking, 2012, 1-22.

Peng, Y. et al., "An SNMP Usage for RELOAD draft-peng-p2psip-snmp-04", Internet Engineering Task Force, P2PSIP, Internet-Draft, Mar. 6, 2012, 1-25.

Rahman, A. et al., "Sleeping and Multicast Consideration for CoAP draft-rahman-core-sleeping-00.txt", Internet Engineering Task Force, CoRE Group, Internet Draft, Jun. 29, 2010, 1-8.

Shelby, Z. et al., "Constrained Application Protocol (CoAP) draft-ietf-core-coap-09", Internet Engineering Task Force, CoRE Working Group, Internet-Draft, Mar. 12, 2012, 1-92.

* cited by examiner

COMMUNICATING WITH A CONSTRAINED INTERNET DEVICE

TECHNICAL FIELD

The present invention relates to methods and apparatus for communicating with a constrained Internet device. More particularly, the invention relates to methods and apparatus for enabling communications to be sent to and received by an Internet device that is only awake periodically.

BACKGROUND

The "Internet of Things" (IoT) refers to the concept of things, especially everyday objects, which are addressable, readable, and/or controllable via the Internet. In particular, the IoT is a global network of computers, sensors, and actuators connected through Internet protocols. The IoT is therefore formed from an increasingly huge number of devices (e.g. predicted to be 50 billion by 2020), and the ubiquity of these devices implies that they need to be connected to the Internet via all kinds of networks, from NAT-based home networks to mobile telecommunications networks. Furthermore, many of these devices are constrained (e.g. wireless sensors) in that they have limited resources and are powered only by batteries. Therefore, in order to extend the battery life, such devices need to have low power consumption and are usually configured to spend significant periods of time sleeping (i.e. being inactive) in order to conserver energy. Consequently, any proposal relating to the IoT should be scalable, easily deployable in networks with firewalls/NATs, and energy efficient in that it should allow devices to sleep as much as possible.

In this regard, peer-to-peer (P2P) technologies have been designed to be scalable, providing the capability to support millions of simultaneous peers. In particular, the Peer-to-Peer (P2P) Session Initiation Protocol (SIP) Working Group (P2PSIP WG) of the Internet Engineering Task Force (IETF) has defined the Resource LOcation And Discovery (RELOAD) base protocol to provide clients with an abstract storage and messaging service between a set of cooperating peers that form an overlay network, which uses a Distributed Hash Table (DHT) algorithm to determine which peers in the overlay network store a particular piece of data. The RELOAD base protocol has also been designed to work in all kinds of network, even in presence of firewalls and NATs.

In addition, the Constrained RESTful Environments (CoRE) Working Group of IETF has defined the Constrained Application Protocol (CoAP), wherein CoAP is a specialized web transfer protocol for use with constrained networks and nodes for Machine-to-Machine (M2M) applications. CoAP realizes the Representational State Transfer (REST) architecture for the most constrained nodes, such as sensors and actuators, and networks. CoAP can be used not only between nodes on the same constrained network but also between constrained nodes and nodes on the Internet. CoAP is a lightweight client-server protocol that runs on top of the User Datagram Protocol (UDP) and aims to be easily translated to Hypertext Transfer Protocol (HTTP) by using URI and Method/Response semantics.

Consequently, there are existing proposals for interworking both the RELOAD base protocol and CoAP for implementing the IoT. For instance, "A Constrained Application Protocol (CoAP) Usage for REsource Location And Discovery (RELOAD)" (draft-jimenez-p2psip-coap-reload-02) is an IETF Internet Draft that proposes the use of a RELOAD-based DHT for the interconnection of COAP-based Wireless Sensor Networks (WSN).

Whilst such solutions provide the desired scalability, they have not considered the sleepy behaviour of constrained devices, as this changes one of the main assumptions about Internet hosts, that is, that they can be contacted at any time. In particular, both RELOAD and CoAP assume that nodes (i.e. either peers/clients or CoAP servers/gateways) are always able to receive messages, which would require IoT devices, or at least their wireless interface, to be fully awake all time, thereby severely limit the lifetime of a battery-powered device. In addition, in order to be small and cheap, many constrained devices will not have a dedicated control/management interface (e.g. a USB port), but will rely on the same network interface employed for the data plane. Therefore, it is not possible to send control or management commands to sleeping devices, unless some additional synchronization or rendezvous mechanism is in place.

Furthermore, this has not yet been considered a problem, as it has been assumed that wireless sensors can be sleeping most of the time, can awaken periodically to send messages with the latest measurement(s), and promptly go back to sleep. Whilst this behaviour may be acceptable for the data plane, this is not the case for the control and management planes, which will typically require that messages can be sent to a device at any time, and has so far been overlooked. However, the control and management planes are essential for the correct operation of all kinds of networks, and this is equally the case for the IoT. As an example, a control plane operation could be to configure a sensor with the initial configuration information, such as the CoAP URI to which it should send its measurements, the time between those measurements, thresholds to filter events, etc. As a further example, a management plane operation could be obtaining the statistics about transmitted/received packets.

SUMMARY

In order to at least mitigate the problems identified above there is herein provided methods and apparatus for enabling communications to be sent to and received by an Internet device that is only awake periodically.

According to a first aspect there is provided a method of enabling an Internet device that is only awake periodically to receive communications sent when the device is not awake. The method comprises, at the device:
 during an initial awake period, establishing a connection to a peer of a RELOAD overlay network as a RELOAD client, and creating a dictionary resource at the RELOAD peer using the Node-ID of the device as the Resource-ID; and
 during a further awake period, establishing a connection to the RELOAD peer and obtaining any communications sent to the device during a sleeping period of the device by retrieving data from the dictionary resource stored at the RELOAD peer.

The method may further comprise, at the end of an awake period, disconnecting from the RELOAD peer and going to sleep. The communications may be command and control message sent to the device by one or more master/control nodes.

The data retrieved from the dictionary resource may comprise one or more key-value pairs, each of the one or more values containing a communication sent to the device during a sleeping period and the associated dictionary key containing a Node-ID of a further device that sent the communication.

The step of creating a dictionary resource at the RELOAD peer using the Node-ID of the device may comprise generating and sending a Store request message requesting storage of a dictionary resource that has a Resource-ID that is equal to the Node-ID of the device. The RELOAD peer may be responsible for a Node-ID of the device.

The Store request message may identify an access control policy, the access control policy requiring that the Store request message creating the dictionary resource is signed using a digital certificate that contains a Node-ID that is equal to the Resource-ID included in the Store request message. The access control policy may further require that, for a Store request message requesting a value be written to the dictionary resource, the value can only be written to the dictionary resource if the dictionary key for the value is equal to a Node-ID included in a digital certificate contained within the Store request message. The access control policy may yet further require that, for a Store request message requesting a value be written to the dictionary resource, if a dictionary key for the value does already exist in the dictionary resource, then the value can only be written to the dictionary resource if a Node-ID included in a digital certificate contained within the Store request message is equal to any of the dictionary key that exists in the dictionary resource and the Node-ID of the device that created the dictionary resource.

The step of obtaining any communications sent to the device during a sleeping period of the device may comprise generating and sending a Fetch request message requesting retrieval of data stored in the dictionary resource.

The method may further comprise authenticating an obtained communication using a message authentication code appended to the obtained communication, the message authentication code having been generated using an authentication key known by the device and a further device that sent the obtained communication. The method may further comprise decrypting an obtained communication using an encryption key known by the device and a further device that sent the obtained communication. In this regard, the encryption key may be derived from the authentication key.

The method may further comprise, after obtaining any communications sent to the device during a sleeping period of the device, removing the communications from the RELOAD peer by overwriting the data in the dictionary resource stored at the RELOAD peer.

The method may further comprise responding to an obtained communication by generating and sending a message directed to a Node-ID that is included as the dictionary key associated with the value that contained the obtained communication. In this regard, the response may be sent as any of a RELOAD message and a CoAP message. Alternatively, the method may further comprise responding to an obtained communication by storing the response in the dictionary resource at the RELOAD peer. The step of storing the response in the dictionary resource at the RELOAD peer may then comprise generating and sending a Store request message requesting a value be written to the dictionary resource, the value containing the response and the associated dictionary key including the Node-ID of the further device.

According to a second aspect there is provided a method of enabling an Internet device to send communications to a further Internet device that is only awake periodically. The method comprises, at the device:
  establishing a connection to a peer of a RELOAD overlay network; and
  sending a communication to the further device by generating and sending a Store request message directed to a Resource-ID that is equal to the Node-ID of the further device, the Store request message requesting a value be written to a dictionary resource, the value containing the communication.

The device may be a master/control node of the further device, and the communication may then be a command and control message. The device may connect to the RELOAD overlay network as any of a RELOAD peer and a RELOAD client.

The Store request may include the Node-ID of the further device as the Resource-ID of the dictionary resource. The Store request may include a dictionary key associated with the value, the dictionary key containing the Node-ID of the device.

The method may further comprise generating a message authentication code for the communication using an authentication key known by the device and the further device, and appending the message authentication code to the communication. The method may further comprise encrypting the communication using an encryption key known by the device and the further device. In this regard, the encryption key may be derived from the authentication key.

The method may further comprise receiving a response to the communication from the further device, wherein the response is received as any of a RELOAD message and a CoAP message. Alternatively, the method may further comprise obtaining a response to the communication from the further device, by retrieving data from the dictionary resource. The step of retrieving data from the dictionary resource may then comprise generating and sending a Fetch request message requesting retrieval of data stored in the dictionary resource, and specifying that the data to be retrieved should be a value associated with a dictionary key that is equal to the Node-ID of the device.

According to a third aspect there is provided a method of enabling an Internet device that is only awake periodically to receive communications sent when the device is not awake. The method comprises, at a further device that has joined a RELOAD overlay network as a RELOAD peer:
  allowing the device to connect to the RELOAD overlay network as a RELOAD client;
  receiving a Store request message from the device requesting storage of a dictionary resource that has a Resource-ID that is equal to the Node-ID of the device;
  creating a dictionary resource at the RELOAD peer in accordance with the Store request message;
  receiving a further Store request message directed to a Resource-ID that is equal to the Node-ID of the device, the further Store request message requesting a value be written to a dictionary resource, the value containing a communication intended for the device; and
  storing the value in the dictionary resource such that the device can obtain the communication by retrieving data from the dictionary resource.

The method may further comprise receiving a Fetch request message from the device, the Fetch request message requesting retrieval of data stored in the dictionary resource, and generating and sending a Fetch response message to the device, the Fetch response message including any values stored in the dictionary resource.

The method may further comprise applying an access control policy identified in the Store request message to determine if a request related to the dictionary resource can be implemented. The access control policy may require that the Store request message requesting creation of the dictionary resource is signed using a digital certificate that contains a Node-ID that is equal to the Resource-ID included in the Store request message.

According to a fourth aspect there is provide an Internet device that is configured to only awaken periodically and that is configured to enable communications to be sent to the device when the device is not awake. The device comprises
- a connection unit configured to establish a connection to a peer of a Resource Location And Discovery Base Protocol, RELOAD, overlay network as a RELOAD client,
- a communication unit configured to, during an initial awake period, create a dictionary resource at the RELOAD peer using the Node-ID of the device as the Resource-ID, and, during a subsequent awake period, to obtain any communications sent to the device by retrieving data from the dictionary resource stored at the RELOAD peer.

The communication unit may be configured to retrieve data from the dictionary resource that comprises one or more key-value pairs, each of the one or more values containing a communication sent to the device and the associated dictionary key containing a Node-ID of a further device that sent the communication.

The communication unit may be configured to create a dictionary resource at the RELOAD peer using the Node-ID of the device by generating and sending a Store request message requesting storage of a dictionary resource that has a Resource-ID that is equal to the Node-ID of the device.

The communication unit may be configured to associate an access control policy with the Store request message, the access control policy requiring that the Store request message is signed using a digital certificate that contains a Node-ID that is equal to the Resource-ID included in the Store request message. The access control policy may further require that, for a Store request message requesting a value be written to the dictionary resource, if a dictionary key for the value does not already exist in the dictionary resource, then the value can only be written to the dictionary resource if the dictionary key for the value is equal to a Node-ID included in a digital certificate contained within the Store request message. The access control policy may yet further requires that, for a Store request message requesting a value be written to the dictionary resource, if a dictionary key for the value does already exist in the dictionary resource, then the value can only be written to the dictionary resource if a Node-ID included in a digital certificate contained within the Store request message is equal to any of the dictionary key that exists in the dictionary resource and the Node-ID of the device that created the dictionary resource.

The communication unit may be configured to obtain any communications sent to the device by generating and sending a Fetch request message requesting retrieval of data stored in the dictionary resource.

The device may further comprise an authentication unit configured to authenticate an obtained communication using a message authentication code appended to the obtained communication, the message authentication code having been generated using an authentication key known by the device and a further device that sent the obtained communication. The device may further comprise an encryption unit configured to decrypt an obtained communication using an encryption key known by the device and a further device that sent the obtained communication. In this regard, the encryption unit may be configured to derive the encryption key from the authentication key.

The communication unit may be further configured to, after obtaining any communications sent to the device, remove the communications from the RELOAD peer by overwriting the data in the dictionary resource stored at the RELOAD peer.

The communication unit may be further configured to respond to an obtained communication by generating and sending a message directed to a Node-ID that is included as the dictionary key associated with the value that contained the obtained communication. Alternatively, the communication unit may be further configured to respond to an obtained communication by storing the response in the dictionary resource at the RELOAD peer. The communication unit may then be further configured to store the response in the dictionary resource at the RELOAD peer by generating and sending a Store request message requesting a value be written to the dictionary resource, the value containing the response and the associated dictionary key including the Node-ID of the further device.

According to a fifth aspect there is provided an Internet device configured to send communications to a further Internet device that is only awake periodically. The device comprises:
- a connection unit configured to establish a connection to a peer of a, RELOAD overlay network; and
- a communication unit configured to send a communication to the further device by generating and sending a Store request message directed to a Resource-ID that is equal to Node-ID of the further device, the Store request message requesting a value be written to a dictionary resource, the value containing the communication.

The communication unit may be configured to include, in the Store request message, the Node-ID of the further device as the Resource-ID of the dictionary resource. The communication unit may be configured to include, in the Store request message, a dictionary key associated with the value, the dictionary key containing the Node-ID of the device.

The device may further comprise an authentication unit configured to generate a message authentication code for the communication using an authentication key known by the device and the further device, and to append the message authentication code to the communication. The device may further comprise an encryption unit configured to encrypt the communication using an encryption key known by the device and the further device. In this regard, the encryption unit may be configured to derive the encryption key from the authentication key.

The communication unit may be further configured to receive a response to the communication from the further device, wherein the response is received as any of a RELOAD message and a CoAP message. Alternatively, the communication unit may be further configured to obtain a response to the communication from the further device by retrieving data from the dictionary resource. The communication unit may then be further configured to retrieve data from the dictionary resource by generating and sending a Fetch request message requesting retrieval of data stored in the dictionary resource, and specifying that the data to be retrieved should be a value associated with a dictionary key that is equal to the Node-ID of the device.

According to a sixth aspect there is provided an Internet device configured to participate in a RELOAD overlay network as a RELOAD peer and to enable a further device that is only awake periodically to receive communications sent when the device is not awake. The device comprises:

a connection unit configured to allow the further device to connect to the RELOAD overlay network as a RELOAD client;

a communication unit configured to receive a Store request message from the further device, the Store request message requesting storage of a dictionary resource that has a Resource-ID that is equal to the Node-ID of the further device;

a resource unit configured to create a dictionary resource at the RELOAD peer in accordance with the Store request message;

the communication being further configured to receive a further Store request message directed to a Resource-ID that is equal to the Node-ID of the further device, the further Store request message requesting a value be written to a dictionary resource, the value containing a communication intended for the further device; and the resource unit being further configured to store the value in the dictionary resource such that the device can obtain the communication by retrieving data from the dictionary resource.

The communication may be further configured to receive a Fetch request message from the device, the Fetch request message requesting retrieval of data stored in the dictionary resource, and to generate and send a Fetch response message to the device, the Fetch response message including any values stored in the dictionary resource.

The device may further comprise an access control unit configured to apply an access control policy identified in the Store request message to determine if a request related to the dictionary resource can be implemented. The access control unit may be further configured to apply an access control policy that requires that the Store request message requesting creation of the dictionary resource is signed using a digital certificate that contains a Node-ID that is equal to the Resource-ID included in the Store request message.

BRIEF DESCRIPTION OF THE DRAWINGS

Aspects of the present invention will now be further described, by way of example only, with reference to the accompanying figures, in which.

DETAILED DESCRIPTION

In order to at least mitigate the problems identified above there will now be described methods and apparatus for enabling an Internet device that is only awake periodically to receive communications sent when the device is not awake. The methods essentially define a new application usage for the RELOAD base protocol, wherein a RELOAD usage defines how a specific application maps its data into something that can be stored in the overlay network, where to store the data, how to secure the data, and how applications can retrieve and use the data.

The method involves, at an Internet device that is only awake periodically (i.e. a constrained device), during an initial awake period, establishing a connection to a peer of the RELOAD overlay network as a RELOAD client, and creating a dictionary resource at the RELOAD peer using the Node-ID of the device. Then, during a further awake period, establishing a connection to the RELOAD peer and obtaining any communications sent to the device during a sleeping period of the device by retrieving data from the dictionary resource stored at the RELOAD peer. In other words, the dictionary resource stored at the RELOAD peer provides a mailbox that can store communications sent to the device by other devices, and that therefore allows these communications to be retrieved by the device when the device is awake. The method therefore allows other devices, such as command and/or management entities, to send messages to a constrained device even when the constrained device is in a sleep mode.

In this regard, the method implemented by a further Internet device that wants to send communications to a recipient device that may only be awake periodically (i.e. a constrained device) involves, establishing a connection to a peer of a RELOAD overlay network, and sending a communication intended for the recipient device by generating and sending a Store request message (StoreReq) directed to a Resource-ID that is equal to the Node-ID of the recipient device, the Store request message requesting a value be written to a dictionary resource, wherein the value contains the communication. In particular, the Store request would include the Node-ID of the recipient device as the Resource-ID of the dictionary resource.

In the context of RELOAD, a dictionary is a set of values each indexed by a dictionary key with one value for each key. In other words, a dictionary resource stores an array of <key, value> pairs, wherein each value contains some stored data. Therefore, the Store request message sent by a further device that wants to send communications to a constrained device will also include a dictionary key associated with the value. Preferably, the dictionary key contains the Node-ID of the further device sends the Store request message in order to identify the sender of the communication that is included as the value.

A constrained device that spends a significant proportion of it's time in a sleep mode cannot participate in the overlay network (i.e. as a peer), as this would require the device to always be awake and connected in order to be able to route (i.e. receive and forward) messages. Therefore, according to the methods described herein, a constrained device (e.g. a battery-powered sensor) is configured to operate as a client of the overlay network, and to establish a connection to the overlay network as a client. In particular, the device will establish a connection to the peer in the overlay network that is responsible for it's Node-ID, as doing so provides that messages may be sent to/from the device using it's Node-ID. However, a further device that wants to send communications to a constrained device, such as a command and/or management entity, can connect to the overlay network as either a client or a peer. In the context of RELOAD, a client is a host that is able to store data in and retrieve data from the overlay network but which does not participate in routing or data storage for the overlay. In contrast, a peer is a host that participates in the overlay, and is therefore responsible for holding some portion of the data that is stored in the overlay and for routing messages on behalf of other hosts.

By using the Node-ID of the constrained device as the Resource-ID when creating the dictionary resource at the RELOAD peer, the method provides that the same mechanisms can be used when sending communications to both constrained devices (e.g. battery-powered sensors) and non-constrained devices (e.g. actuators). In this regard, non-constrained devices do not have the same constraints on there power usage as constrained devices, such that they do not sleep and can connect to the overlay network as peers, and therefore do not need to make use of a mailbox. In other words, a further device that wants to send a communication to a recipient device can do so by sending a Store request message including the communication to a Resource-ID that is equal to the Node-ID of the recipient device. If the recipient device is a constrained device, the Store request message will then be routed to a mailbox provided for the recipient device that is stored at the peer responsible for the Node-ID of the recipient device. If the recipient device is a non-constrained device, the Store request message will then be routed to the recipient device itself (as the non-constrained device can connect to the overlay network as a peer that is therefore responsible for a Resource-ID that is equal to it's Node-ID), such that a non-constrained device does not need to poll a remote peer to obtain the communications sent to it.

In this regard, in order to create a dictionary resource at the RELOAD peer using the Node-ID of the device, an Internet device that is only awake periodically (i.e. a constrained device) generates and sends a Store request message requesting storage of a dictionary resource that has a Resource-ID that is equal to the Node-ID of the device. Preferably, the dictionary resource created by the constrained device will be associated with an access control policy that defines rules for determining whether a request relating to the resource will succeed or fail. In the context of RELOAD, a RELOAD usage defines one or more "Kinds" of data, wherein a Kind defines a particular type of data that can be stored in the overlay, and each Kind is identified with a unique Kind-ID. Therefore, by including the Kind-ID of the appropriate Kind of data in the Store request message, the constrained device identifies the associated access control policy as being applicable to the dictionary resource. The access control policy should therefore be applied by the responsible peer to any Store request that includes the Kind-ID associated with such a mailbox dictionary resource.

In order to ensure that the dictionary resource will function as a mailbox for a constrained device, the access control policy associated with the dictionary resource should require that a Store request message requesting creation a dictionary resource of this Kind is signed using a digital certificate that contains a Node-ID that is equal to the Resource-ID included in that Store request message. In other words, to be able to create a dictionary resource that provides a mailbox, the Store request message must be signed by a device that knows both the Node-ID and the private key used by device for which the dictionary resource is to provide a mailbox.

In addition, the access control policy should further require that, for a Store request message requesting a new value be written to the dictionary resource, then the value can only be written to the dictionary resource if the dictionary key for the value is equal to a Node-ID included in a digital certificate contained within the Store request message. In other words, to be able to write a new value to the mailbox provided by the dictionary resource, the dictionary key associated with the value must contain the Node-ID of the sender of the Store request message.

Preferably, the access control policy further should require that, for a Store request message requesting a value be written to the dictionary resource, if a dictionary key for the value does already exist in the dictionary resource, then the value can only be written to the dictionary resource if a Node-ID included in a digital certificate contained within the Store request message is equal to any of the dictionary key that exists in the dictionary resource and the Node-ID of the device that created the dictionary resource. In other words, a value that is already stored in the mailbox provided by the dictionary resource can only be overwritten by the device that requested storage of the stored value, or the device that created the dictionary resource.

By way of example, such an access control policy could by referred to as a CLIENT-ID-MATCH policy with an associated Kind-ID of COMMAND-MAILBOX. The CLIENT-ID-MATCH policy could then be described as:

"In the CLIENT-ID-MATCH policy, a given resource MUST be created if only if the signer's certificate has the Node-ID that exactly equals the Resource-ID of the resource. If the resource is a dictionary, the dictionary key of any new value MUST be equal to the Node-ID in the certificate of the signer. A value MUST NOT be overwritten by other Node-ID than the one stated in the key or the owner of the resource."

At the end of the initial awake period, during which the constrained device has created the dictionary resource, the constrained device disconnects from the RELOAD peer and goes to sleep in order to conserve energy. When the constrained device subsequently awakens, the constrained device obtains any communications sent to the device during the period in which it was sleeping by retrieving data from the dictionary resource. To do so, the constrained device generates and sends a Fetch request (FetchReq) message requesting retrieval of data stored in the dictionary resource. The Fetch request message should include the Resource-ID of the dictionary resource, which should be equal to the Node-Id of the device. With regards to the dictionary resource, if any communications have been sent to the constrained device, then the data stored in the dictionary resource will comprise one or more key-value pairs, each of the one or more values containing a communication sent to the device during the sleeping period. Preferably, the dictionary key associated with each value retrieved from the dictionary resource contains a Node-ID of a further device that sent the communication. Therefore, in order to retrieve all of the data (i.e. communications) stored in the dictionary resource, the Fetch request message should specify that the data model of the data is "dictionary" and the model specifier should not specify any keys. The constrained device will then receive a Fetch response (FetchAns) message from the peer that stores the dictionary resource (i.e. the peer that is responsible for the Resource-ID of the dictionary resource) including all of the key-value pairs stored in the dictionary.

After obtaining any communications sent to the constrained device during a sleeping period of the device, the constrained device can remove the communications from the RELOAD peer by overwriting the data in the dictionary resource stored at the RELOAD peer. To do so, the constrained device can simply send another Store request message requesting storage of a dictionary resource that has a Resource-ID that is equal to the Node-ID of the device.

In addition, the constrained device can respond to an obtained communication by generating and sending a message directed to the Node-ID that is included as the dictionary key associated with the value that contained the obtained communication, as the dictionary key should include the Node-ID of the sender of the communication. In this regard, the response message can be sent as either a RELOAD message or a CoAP message.

Alternatively, the constrained device can respond to an obtained communication by storing the response in the dictionary resource stored at the RELOAD peer. This can be achieved by generating and sending a Store request message requesting a value be written to the dictionary resource, wherein the value contains the communication response and the associated dictionary key includes the Node-ID of the further device that sent the communication. The further device that sent the communication can then retrieve the communication response sent by the constrained device by retrieving data from the dictionary resource. To do so, the further device can generate and send a Fetch request message requesting retrieval of data stored in the dictionary resource, and specify that the data to be retrieved should be a value associated with a dictionary key that is equal to the Node-ID of the further device. The further device will then receive a Fetch response message from the peer that stores the dictionary resource (i.e. the peer that is responsible for the Resource-ID of the dictionary resource), wherein the Fetch response message includes the relevant key-value pairs (i.e. the key-value pair whose key is equal to the Node-ID of the further device).

In order to secure any communications and/or communication response sent via the mailbox provided by the dictionary resource, a recipient device and a sending device can share an authentication key, which can then be used by the sending device to generate a message authentication code (MAC) (e.g. using the HMAC-SHA256 algorithm) that is appended to a communication. The recipient can then use the MAC appended to the communication to authenticate the communication based on the shared authentication key.

Optionally, an encryption key shared by both a recipient device and a sending device could be used to encrypt any communications and/or communication responses sent via the mailbox provided by the dictionary resource; the encryption being based on a symmetric key algorithm (e.g. AES128). In this regard, the encryption key could be derived from the authentication key, or could be unrelated to the authentication key. The recipient could then use the encryption key to decrypt the communication. If both authentication and encryption are to be used, then the MAC should preferably be computed over the encrypted communication, so that the communication can be authenticated without having to decrypt it.

Figure 1:
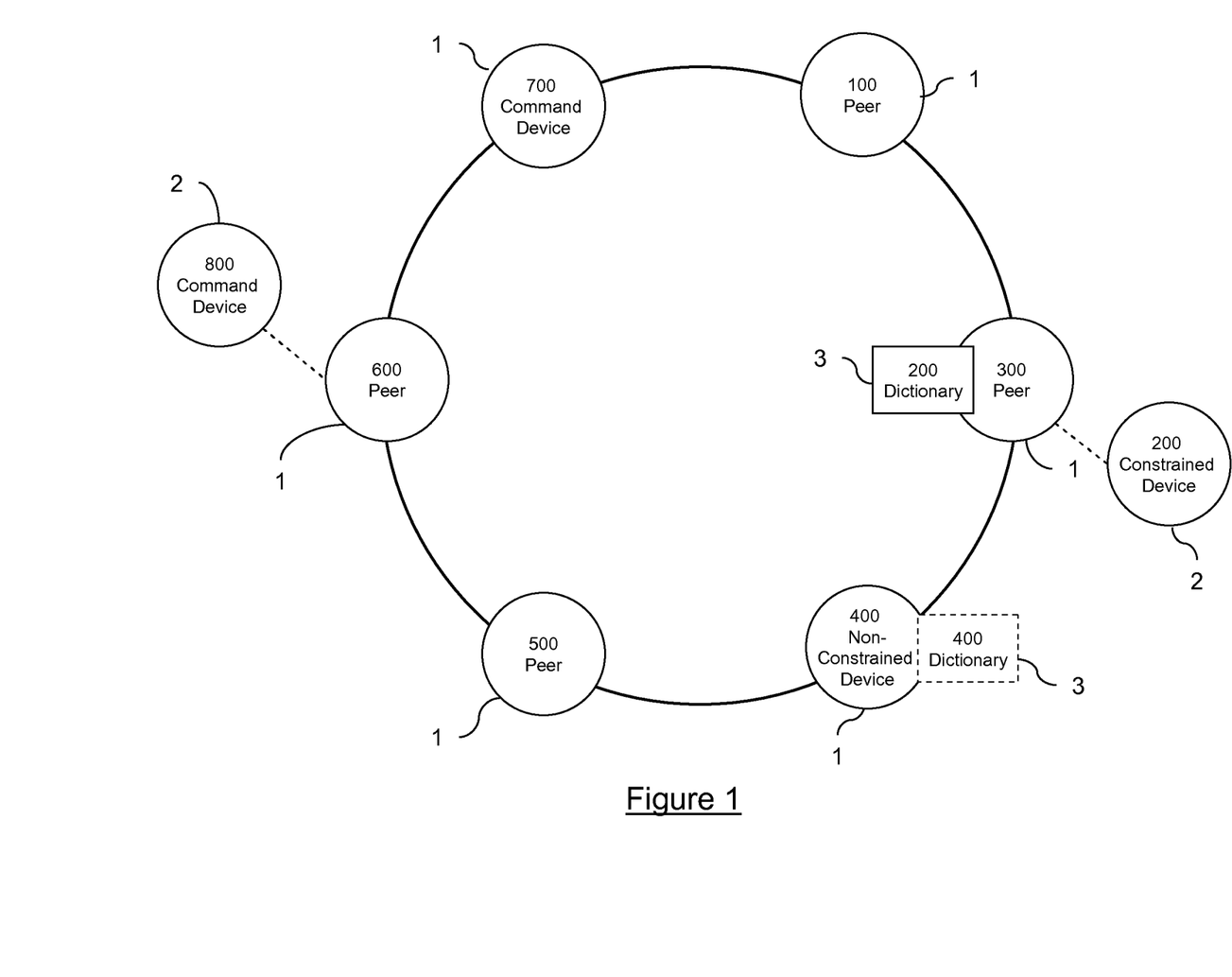
FIG. 1 illustrates schematically an example of a RELOAD network architecture suitable for implementing the methods described herein.

FIG. 1 illustrates schematically an example of a RELOAD network architecture suitable for implementing the methods described herein. This example RELOAD network includes a number of peers 1 and clients 2 each having there own unique Node-ID. The peers 1 store the data for which they are responsible as resources 3, wherein each resource 3 has a unique Resource-ID, and the data a peer 1 is responsible for storing is identified using a set of Resource-IDs that are determined by the Node-ID of that peer. In the example of FIG. 1, the Node-IDs and Resource-IDs are the three-digit numbers ranging from 100 to 800.

In FIG. 1, there is a single constrained device (e.g. a battery-powered sensor) that has connected to the network as a client with a Node-ID of 200. Constrained device 200 has connected to a peer that is responsible for the Node-ID of the constrained device, wherein the responsible peer has a Node-ID of 300. Responsible peer 300 is then also connected to two further peers that have Node-IDs of 100 and 400 respectively. Peer 400 is a non-constrained device (e.g. an actuator) that has connected to the network as a peer, and is also connected to another peer that has a Node-ID of 500. Peer 500 is then also connected to a further peer that has a Node-ID of 600. Peer 600 is then also connected to a further peer that has a Node-ID of 700, and to a client with a Node-ID of 800. Peer 700 and client 800 are both command devices that implement control and/or management of the other devices within the network. Peer 700 is also connected to peer 100.

As a result of implementing the method described herein, constrained device 200 has created a dictionary resource that is stored at the responsible peer 300 in order to provide a mailbox for communications that are intended for the constrained device 200. The dictionary resource has been created such that the Resource-ID of the resource that is equal to the Node-ID of the constrained device 200 (i.e. the dictionary resource has a Resource-ID of 200). In addition, the non-constrained device 400 effectively implements a logical/virtual dictionary resource with a Resource-ID that is equal to the Node-ID of the non-constrained device 400 (i.e. the logical/virtual dictionary resource has a Resource-ID of 400), such that communications can be sent to both the constrained device 200 and the non-constrained device 400 using the same mechanisms.

Figure 2:
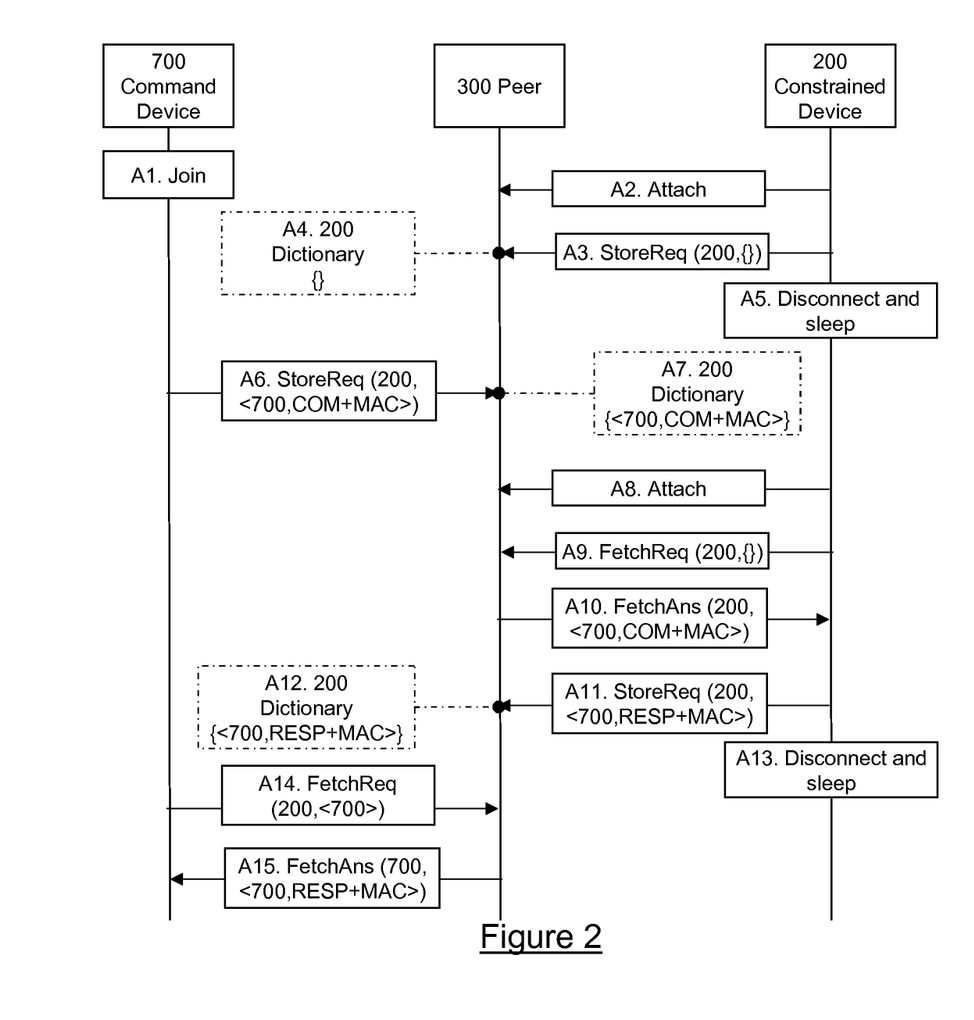
FIG. 2 is a signalling flow diagram illustrating an example of the process implemented in order for communications to be sent to a constrained device that is only awake periodically in accordance with the methods described herein.

FIG. 2 is a signalling flow diagram illustrating an example of the process implemented in order for communications to be sent by command device 700 to constrained device 200 that is only awake periodically in accordance with the methods described herein. The steps performed are as follows:

A1. Command device 700 connects to the network as a peer. To do so, command device 700 sends a Join request message to the peer responsible for it's Node-ID (not shown).

A2. During an initial awake period, constrained device 200 connects to the network as a client. To do so, constrained device 200 sends an Attach request to the peer responsible for it's Node-ID, which in this example is peer 300.

A3. Constrained device 200 then creates a dictionary resource at peer 300 using the Node-ID of the constrained device 200. To do so, constrained device 200 generates and sends sending a Store request message requesting storage of a dictionary resource that has a Resource-ID that is equal to the Node-ID of the constrained device 200 (i.e. Resource-ID=200). For example, the Store request message could include the Node-ID of the constrained device 200 in the "destination list" of the Forwarding Header, with the destination type set to "resource". In addition, the "resource" element of the Store request message would include the Node-ID of the constrained device 200 as the Resource-ID of the resource to be stored. The Store request message should also include the Kind-ID that is associated with the appropriate access control policy for a mailbox dictionary resource, and should have the "exists" field value set to false.

A4. The Store request message is routed to peer 300. Provided that the Store request message meets the appropriate access control policy, then the Store request message results in the storage of an empty dictionary resource at peer 300, the dictionary resource having a Resource-Id of 200.

A5. At the end of the awake period, constrained device 200 disconnects from peer 300 and goes to sleep.

A6. During the period in which constrained device 200 is sleeping, command device 700 sends a communication to the constrained device 200. To do so, command device 700 generates and sends a Store request message directed to the Node-ID of the constrained device 200 as the Resource-ID. The Store request message requests that a key-value pair is written to a dictionary resource, wherein the value contains the communication and a MAC for the communication, and the dictionary key associated with the value contains the Node-ID of the command device 700. For example, this Store request message could include the Resource-ID of the mailbox (i.e. which is also the Node-ID of the constrained device 200) in the "destination list" of the Forwarding Header, with the destination type set to "resource". In addition, the "resource" element of the Store request message would include the Node-ID of the constrained device 200 as the Resource-ID of the resource to be stored.

A7. The Store request message is routed to peer 300, as peer 300 is responsible for the Resource-ID. Provided that the Store request message meets the appropriate access control policy, the Store request message results in the storage of the key-value pair in the dictionary resource that provides a mailbox for communications sent to constrained device 200.

A8. When constrained device 200 subsequently awakens, the constrained device 200 re-connects to the network as a client by sending a further Attach request to peer 300.

A9. Constrained device 200 can then obtain any communications sent to it whilst it was a sleeping by retrieving data from dictionary resource 200 stored at peer 300. To do so, constrained device 200 generates and sends a Fetch request message requesting retrieval of data stored in dictionary resource 200. The Fetch request message includes the Resource-ID of dictionary resource 200. In addition, in order to retrieve all of the data stored in dictionary resource 200, the Fetch request message specifies that the data model of the data is "dictionary" and the does not specify any keys.

A10. The Fetch request message is routed to peer 300, which generates and sends a Fetch response message that includes all of the key-value pairs stored in dictionary resource 200. In this example, only a single communication has been sent to constrained device 200 such that the Fetch response message only includes a single key-value pair.

A11. Constrained device 200 processes the communication retrieved from the mailbox provided by dictionary resource 200. This processing will include authentication of the communication using the MAC that is appended to the communication. Constrained device 200 also determines that a response to this communication is required, and therefore stores the communication response in dictionary resource 200 so that the communication response can be retrieved by the sender of the communication. To do so, constrained device 200 generates and sends a Store request message requesting a value be written to dictionary resource 200. The Store request message requests that a key-value pair is written to a dictionary resource, wherein the value contains the communication response and a MAC for the response, and the dictionary key associated with the value contains the Node-ID of command device 700 that sent the communication.

A12. The Store request message is routed to peer 300. Provided that the Store request message meets the appropriate access control policy, the Store request message results in the storage of the key-value pair in dictionary resource 200.

A13. At the end of this further awake period, constrained device 200 disconnects from peer 300 and goes to sleep.

A14. Command device 700 then determines that it should check for a response to the communication sent in step A6 by retrieving any relevant data from dictionary resource 200. To do so, command device 700 generates and sends a Fetch request message requesting retrieval of any data stored in dictionary resource 200 for that device by specifying that the data to be retrieved should be a value associated with a dictionary key that is equal to the Node-ID of command device 700.

A15. The Fetch request message is routed to peer 300, which generates and sends a Fetch response message including the key-value pair stored in dictionary resource 200 that has a dictionary of 700.

Figure 3:
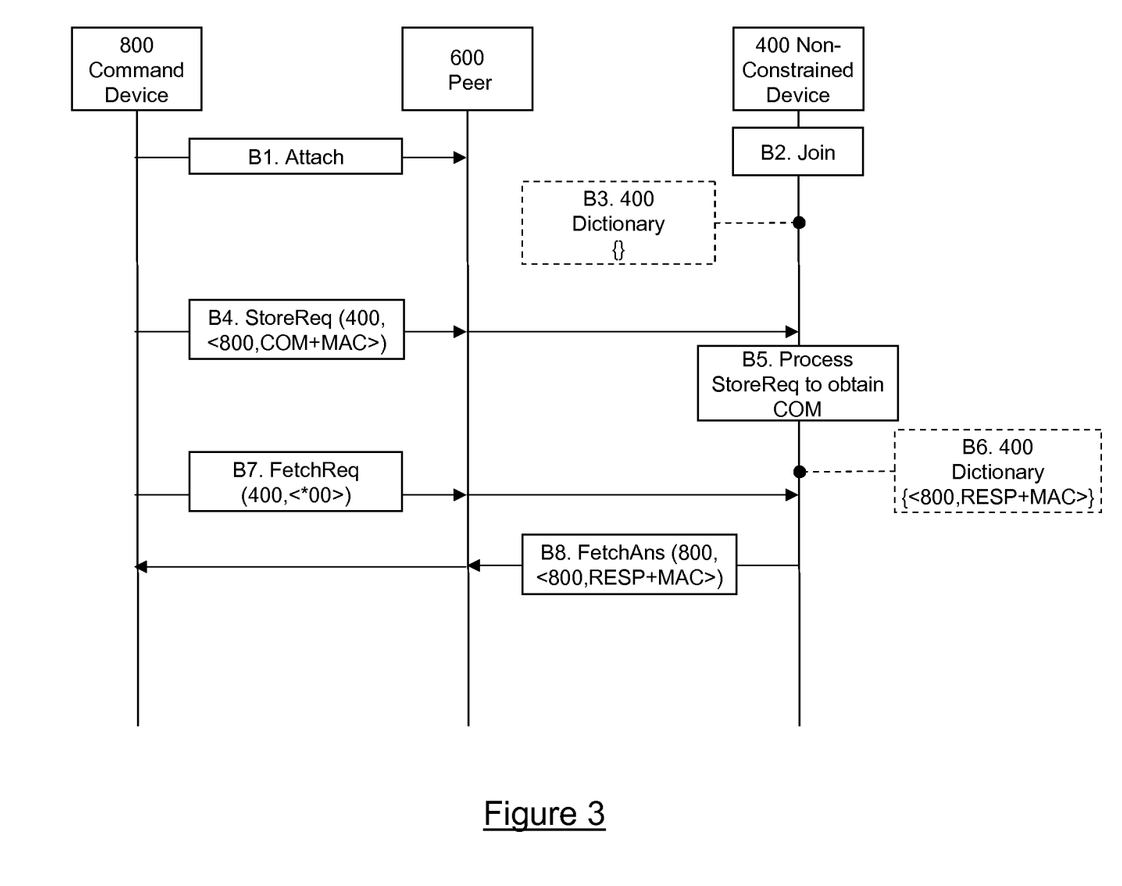
FIG. 3 is a signalling flow diagram illustrating an example of the process implemented in order for communications to be sent to a non-constrained device in accordance with the methods described herein.

FIG. 3 is a signalling flow diagram illustrating an example of the process implemented in order for communications to be sent by command device 800 to non-constrained device 400 that is connected to the RELOAD overlay network as a peer in accordance with the methods described herein. The steps performed are as follows:

B1. Command device 800 connects to the network as a client. To do so, command device 800 sends an Attach request to the peer responsible for it's Node-ID, which in this example is peer 600.

B2. Non-constrained device 400 connects to the network as a peer. To do so, non-constrained device 400 sends a Join request message to the peer responsible for it's Node-ID (not shown).

B3. Non-constrained device 400 also creates a logical/virtual dictionary resource with a Resource-ID that is equal to the Node-ID of non-constrained device 400 (i.e. Resource-ID=400). In this regard, as the non-constrained device 400 is itself responsible for the logical/virtual dictionary resource, it is not necessary to create an actual dictionary resource (e.g. by reserving any memory etc), but merely to implement the same processing in order to handle RELOAD messages that are directed to a dictionary resource.

B4. Command device 800 then sends a communication to non-constrained device 400. To do so, command device 800 generates and sends a Store request message using the Node-ID of the non-constrained device 400 as the Resource-ID. The Store request message requests that a key-value pair is written to a dictionary resource, wherein the value contains the communication and a MAC for the communication, and the dictionary key associated with the value contains the Node-ID of the command device 800. For example, the Store request message could include the Node-ID of the non-constrained device 400 in the "destination list" of the Forwarding Header, with the destination type set to "resource". In addition, the "resource" element of the Store request message would include the Node-ID of the non-constrained device 400 as the Resource-ID of the resource to be stored.

B5. The Store request message is routed to non-constrained device 400, as non-constrained device 400 is responsible for the Resource-ID. If non-constrained device 400 were to actually store a dictionary resource, then the Store request message would result in the storage of the key-value pair in the dictionary resource. However, as the dictionary resource is merely a logical/virtual dictionary resource, non-constrained device 400 processes the Store request message to obtain the communication. For example, this processing should include determining if the Store request message meets the appropriate access control policy, and authentication of the communication using the MAC that is appended to the communication.

B6. Non-constrained device 400 also determines that a response to this communication is required, and therefore stores the communication response as a key-value pair, wherein the value contains the communication response and a MAC for the response, and the dictionary key associated with the value contains the Node-ID of command device 800 that sent the communication.

B7. Command device 800 then determines that it should check for a response to the communication sent in step B4 by retrieving any relevant data from logical/virtual dictionary resource 400. Command device 800 is not aware that the dictionary resource is merely logical/virtual, and therefore generates and sends a Fetch request message requesting retrieval of any data stored in dictionary resource 400 for that device by specifying that the data to be retrieved should be a value associated with a dictionary key that is equal to the Node-ID of command device 800.

B18. The Fetch request message is routed to non-constrained device 400, which generates and sends a Fetch response message including the key-value pair in which it has stored the communication response.

Figure 4:
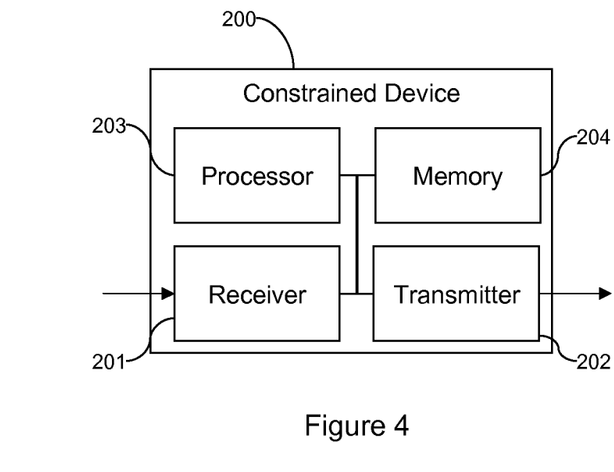
FIG. 4 illustrates schematically an embodiment of a constrained device configured to implement the methods described herein.
Figure 5:
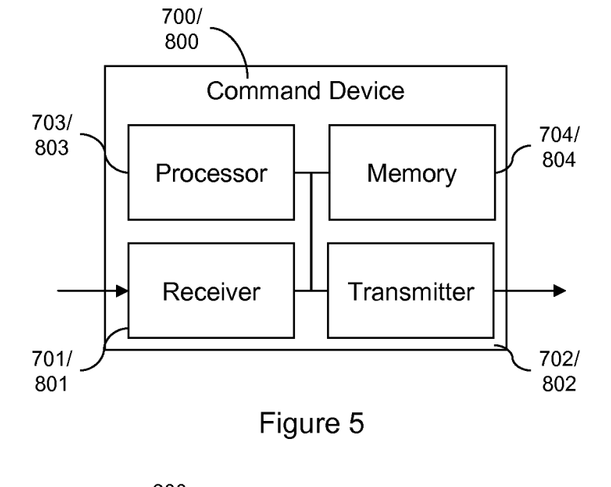
FIG. 5 illustrates schematically an embodiment of a command device configured to implement the methods described herein.

FIG. 4 illustrates schematically an embodiment of a constrained device 200 configured to implement the methods described above. The constrained device 200 can be implemented as a combination of computer hardware and software and comprises a receiver 201, transmitter 202, a processor 203, and a memory 204. The memory 204 stores the various programs/executable files that are implemented by the processor 203, and also provides a storage unit for any required data. The programs/executable files stored in the memory 204, and implemented by the processor, can include but are not limited to FIG. 5 illustrates schematically an embodiment of a command device 700/800 configured to implement the methods described above. The command device 700/800 can be implemented as a combination of computer hardware and software and comprises a receiver 701/801, transmitter 702/802, a processor 703/803, and a memory 704/804. The memory 704/804 stores the various programs/executable files that are implemented by the processor 703/803, and also provides a storage unit for any required data. The programs/executable files stored in the memory 704/804, and implemented by the processor, can include but are not limited to a connection unit, a communication unit, an authentication unit, and an encryption unit that are configured to implement the methods described above.

Figure 6:
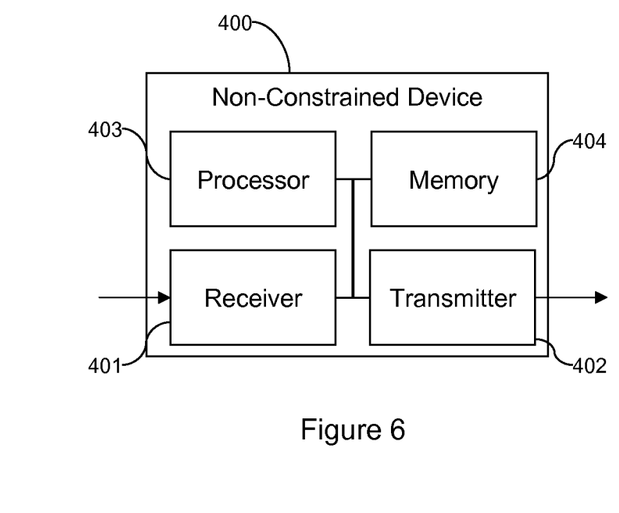
FIG. 6 illustrates schematically an embodiment of a non-constrained device configured to implement the methods described herein.

FIG. 6 illustrates schematically an embodiment of a non-constrained device 400 configured to implement the methods described above. The non-constrained device 400 can be implemented as a combination of computer hardware and software and comprises a receiver 401, transmitter 402, a processor 403, and a memory 404. The memory 404 stores the various programs/executable files that are implemented by the processor 403, and also provides a storage unit for any required data. The programs/executable files stored in the memory 404, and implemented by the processor, can include but are not limited to a connection unit, a communication unit, an authentication unit, and an encryption unit that are configured to implement the methods described above.

Figure 7:
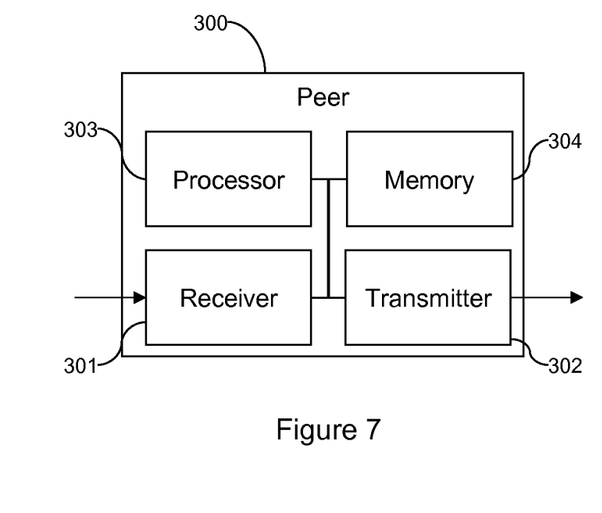
FIG. 7 illustrates schematically an embodiment of a peer configured to provide a mailbox in accordance with the methods described herein.

FIG. 7 illustrates schematically an embodiment of a peer 300 configured to provide a mailbox in accordance with the methods described above. The peer 300 can be implemented as a combination of computer hardware and software and comprises a receiver 301, transmitter 302, a processor 303, and a memory 304. The memory 304 stores the various programs/executable files that are implemented by the processor 303, and also provides a storage unit for any required data, such as resources requested by other nodes of the RELOAD network. The programs/executable files stored in the memory 304, and implemented by the processor, can include but are not limited to a connection unit, a communication unit, a resource unit and an access control unit that are configured to implement the methods described above.

The methods and apparatus described above provides a mechanism to send control and management commands to devices that are only intermittently connected. This mechanism may be particularly useful for sensor and actuators employed in Internet of Things (IoT) scenarios. In addition, the mechanism described herein is fully distributed, and therefore does not have any single point of failure. Moreover, it provides that control and management traffic is not concentrated in a single point of the network, but it is distributed among all peers. Furthermore, the overall traffic in the RELOAD network is minimized as most messages are sent to a direct connection (e.g. constrained device are attached to their responsible peer). In particular, the methods and apparatus described above enable the control and management of devices that are sleeping most of the time and/or in networks with firewalls or NATs. The methods and apparatus described above also provide security measures for the mailbox mechanism, such that devices can verify the integrity and authenticity of the communications, which may be also encrypted for privacy reasons.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and elements that are of particular relevance are shown. Those skilled in the art will be aware those messages and elements that have not been included in this illustration.

The invention claimed is:

1. A method of enabling an Internet device that is only awake periodically to receive communications sent when the device is not awake, the method comprising, at the device:
    during an initial awake period, establishing a connection to a peer of a Resource Location And Discovery Base Protocol (RELOAD) overlay network as a RELOAD client, and creating a dictionary resource at the RELOAD peer using the Node-ID of the device as the Resource-ID; and
    during a further awake period, establishing a connection to the RELOAD peer and obtaining any communications sent to the device during a sleeping period of the device by retrieving data from the dictionary resource stored at the RELOAD peer;
wherein the step of creating a dictionary resource at the RELOAD peer using the Node-ID of the device comprises generating and sending a Store request message requesting storage of a dictionary resource that has a Resource-ID that is equal to the Node-ID of the device, and wherein the Store request message identifies an access control policy, the access control policy requiring that the Store request message creating the dictionary resource is signed using a digital certificate that contains a Node-ID that is equal to the Resource-ID included in the Store request message.

2. The method of claim 1, wherein the data retrieved from the dictionary resource comprises one or more key-value pairs, each of the one or more values containing a communication sent to the device during a sleeping period and the associated dictionary key containing a Node-ID of a further device that sent the communication.

3. The method of claim 2, wherein obtaining any communications sent to the device during a sleeping period of the device comprises generating and sending a Fetch request message requesting retrieval of data stored in the dictionary resource.

4. The method of claim 2, further comprising responding to an obtained communication by storing the response in the dictionary resource at the RELOAD peer.

5. The method of claim 4, wherein storing the response in the dictionary resource at the RELOAD peer comprises generating and sending a Store request message requesting a value be written to the dictionary resource, the value containing the response and the associated dictionary key including the Node-ID of the further device.

6. The method of claim 1, wherein the access control policy further requires that, for a Store request message requesting a value be written to the dictionary resource, the value can only be written to the dictionary resource if the dictionary key for the value is equal to a Node-ID included in a digital certificate contained within the Store request message.

7. The method of claim 1, wherein the access control policy further requires that, for a Store request message requesting a value be written to the dictionary resource, if a dictionary key for the value does already exist in the dictionary resource, then the value can only be written to the dictionary resource if a Node-ID included in a digital certificate contained within the Store request message is equal to any of the dictionary key that exists in the dictionary resource and the Node-ID of the device that created the dictionary resource.

8. A method of enabling an Internet device to send communications to a further Internet device that is only awake periodically, the method comprising, at the device:
    establishing a connection to a peer of a Resource Location And Discovery Base Protocol (RELOAD) overlay network;
    sending a communication to the further device by generating and sending a Store request message directed to a Resource-ID that is equal to the Node-ID of the further device, the Store request message requesting a value be written to a dictionary resource, the value containing the communication; and
    obtaining a response to the communication from the further device, by retrieving data from the dictionary resource, wherein retrieving data from the dictionary resource comprises generating and sending a Fetch request message requesting retrieval of data stored in the dictionary resource, and specifying that the data to be retrieved should be a value associated with a dictionary key that is equal to the Node-ID of the device.

9. The method of claim 8, wherein the Store request includes a dictionary key associated with the value, the dictionary key containing the Node-ID of the device.

10. An Internet device that is configured to only awaken periodically and that is configured to enable communications to be sent to the device when the device is not awake, the device comprising:
    a connection unit configured to establish a connection to a peer of a Resource Location And Discovery Base Protocol (RELOAD) overlay network as a RELOAD client;
    a communication unit configured to, during an initial awake period, create a dictionary resource at the RELOAD peer using the Node-ID of the device as the Resource-ID, and, during a subsequent awake period, to obtain any communications sent to the device by retrieving data from the dictionary resource stored at the RELOAD peer;
    wherein the communication unit is configured to associate an access control policy with the Store request message, the access control policy requiring that the Store request message is signed using a digital certificate that contains a Node-ID that is equal to the Resource-ID included in the Store request message.

11. The Internet device of claim 10, wherein the communication unit is configured to retrieve data from the dictionary resource that comprises one or more key-value pairs, each of the one or more values containing a communication sent to the device and the associated dictionary key containing a Node-ID of a further device that sent the communication.

12. The Internet device of claim 11 wherein the communication unit is further configured to respond to an obtained communication by storing the response in the dictionary resource at the RELOAD peer.

13. The Internet device of claim 12, wherein the communication unit is further configured to store the response in the dictionary resource at the RELOAD peer by generating and sending a Store request message requesting a value be written to the dictionary resource, the value containing the response and the associated dictionary key including the Node-ID of the further device.

14. The Internet device of claim 10, wherein the communication unit is configured to create a dictionary resource at the RELOAD peer using the Node-ID of the device by generating and sending a Store request message requesting storage of a dictionary resource that has a Resource-ID that is equal to the Node-ID of the device.

15. The Internet device of claim 10, wherein the communication unit is configured to obtain any communications sent to the device by generating and sending a Fetch request message requesting retrieval of data stored in the dictionary resource.

16. An Internet device configured to send communications to a further Internet device that is only awake periodically, the device comprising:
    a connection unit configured to establish a connection to a peer of a Resource Location And Discovery Base Protocol (RELOAD) overlay network;
    a communication unit configured to send a communication to the further device by generating and sending a Store request message directed to a Resource-ID that is equal to Node-ID of the further device, the Store request message requesting a value be written to a dictionary resource, the value containing the communication; and
    retrieve data from the dictionary resource by generating and sending a Fetch request message requesting retrieval of data stored in the dictionary resource, and specifying that the data to be retrieved should be a value associated with a dictionary key that is equal to the Node-ID of the device.

17. The Internet device of claim 16, wherein the communication unit is configured to include, in the Store request message, the Node-ID of the further device as the Resource-ID of the dictionary resource.

18. The Internet device of claim 16, wherein the communication unit is configured to include, in the Store request message, a dictionary key associated with the value, the dictionary key containing the Node-ID of the device.

19. The Internet device of claim 16, wherein the communication unit is further configured to obtain a response to the communication from the further device by retrieving data from the dictionary resource.

20. An Internet device configured to participate in a Resource Location And Discovery Base Protocol (RELOAD) overlay network as a RELOAD peer and to enable a further device that is only awake periodically to receive communications sent when the device is not awake, the device comprising:
- a connection unit configured to allow the further device to connect to the RELOAD overlay network as a RELOAD client;
- a communication unit configured to receive a Store request message from the further device, the Store request message requesting storage of a dictionary resource that has a Resource-ID that is equal to the Node-ID of the further device;
- a resource unit configured to create a dictionary resource at the RELOAD peer in accordance with the Store request message;
- the communication unit being further configured to receive a further Store request message directed to a Resource-ID that is equal to the Node-ID of the further device, the further Store request message requesting a value be written to a dictionary resource, the value containing a communication intended for the further device; and
- the resource unit being further configured to store the value in the dictionary resource such that the device can obtain the communication by retrieving data from the dictionary resource;

the Internet device further comprising an access control unit configured to apply an access control policy identified in the Store request message to determine if a request related to the dictionary resource can be implemented, wherein the access control unit is further configured to apply an access control policy that requires that the Store request message requesting creation of the dictionary resource is signed using a digital certificate that contains a Node-ID that is equal to the Resource-ID included in the Store request message.

21. The Internet device of claim 20, wherein the communication is further configured to receive a Fetch request message from the device, the Fetch request message requesting retrieval of data stored in the dictionary resource, and to generate and send a Fetch response message to the device, the Fetch response message including any values stored in the dictionary resource.

* * * * *